May 28, 1957  A. H. HAWES  2,793,720
SCAFFOLDING AND OTHER STRUCTURAL ELEMENTS
Filed Dec. 19, 1952  9 Sheets-Sheet 3
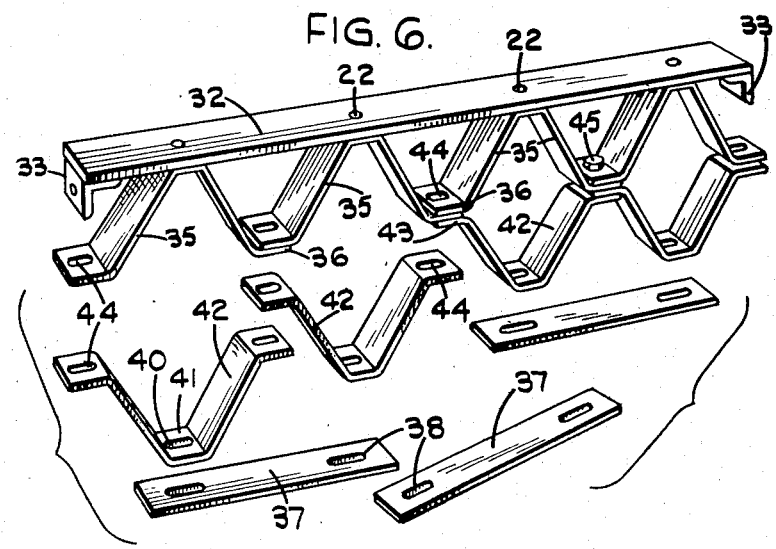
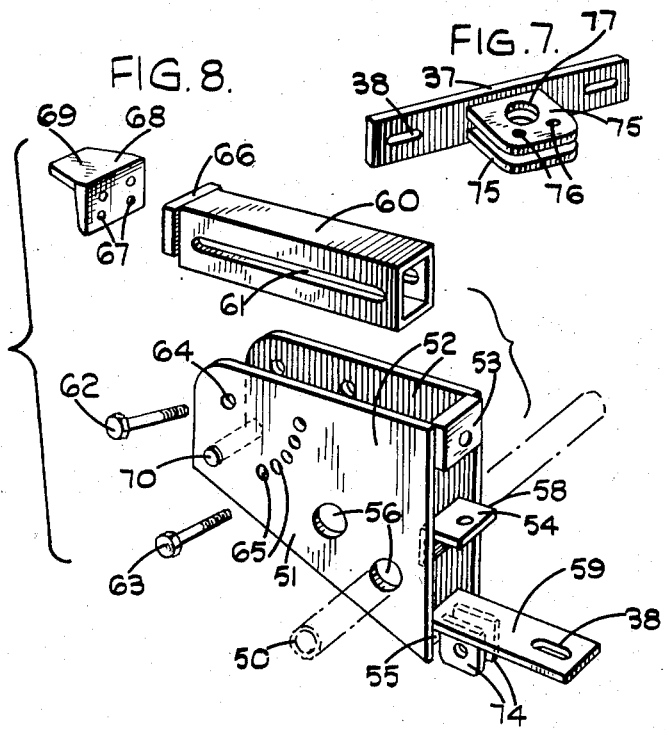
INVENTOR
Albert Henry Hawes
BY Lucke & Lucke
AGENTS

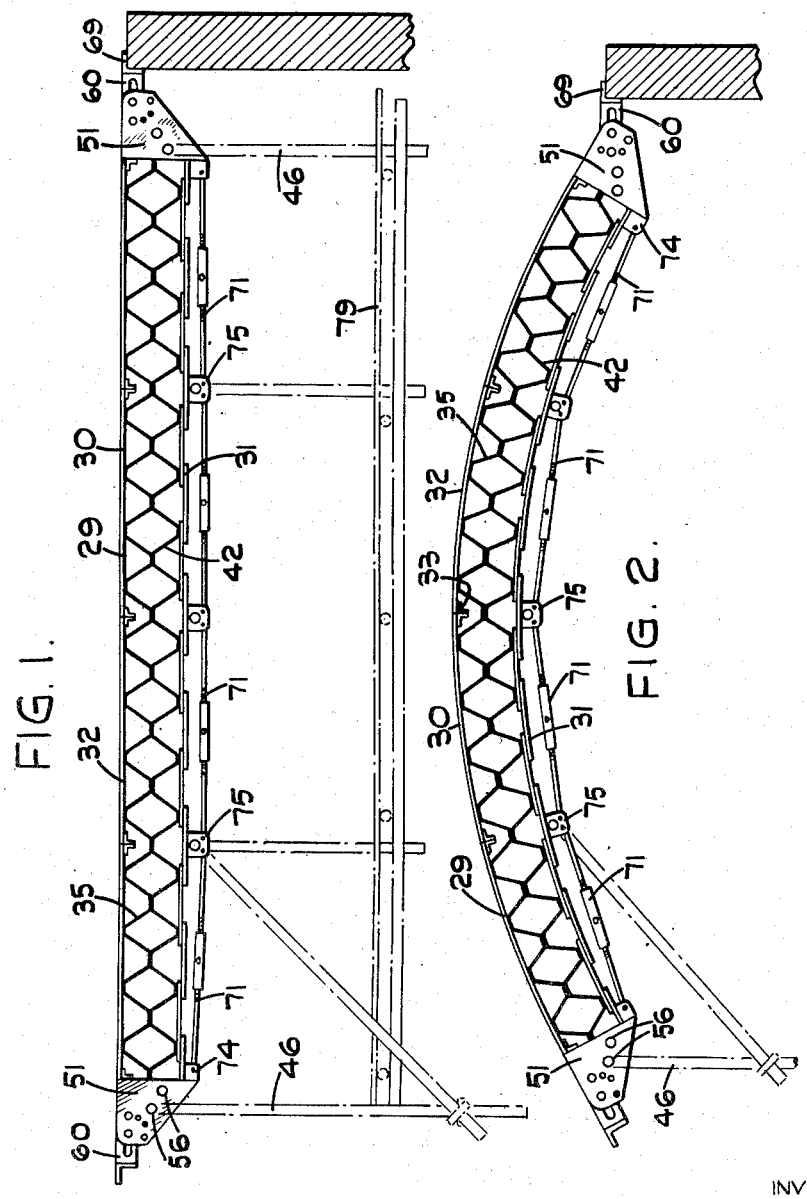

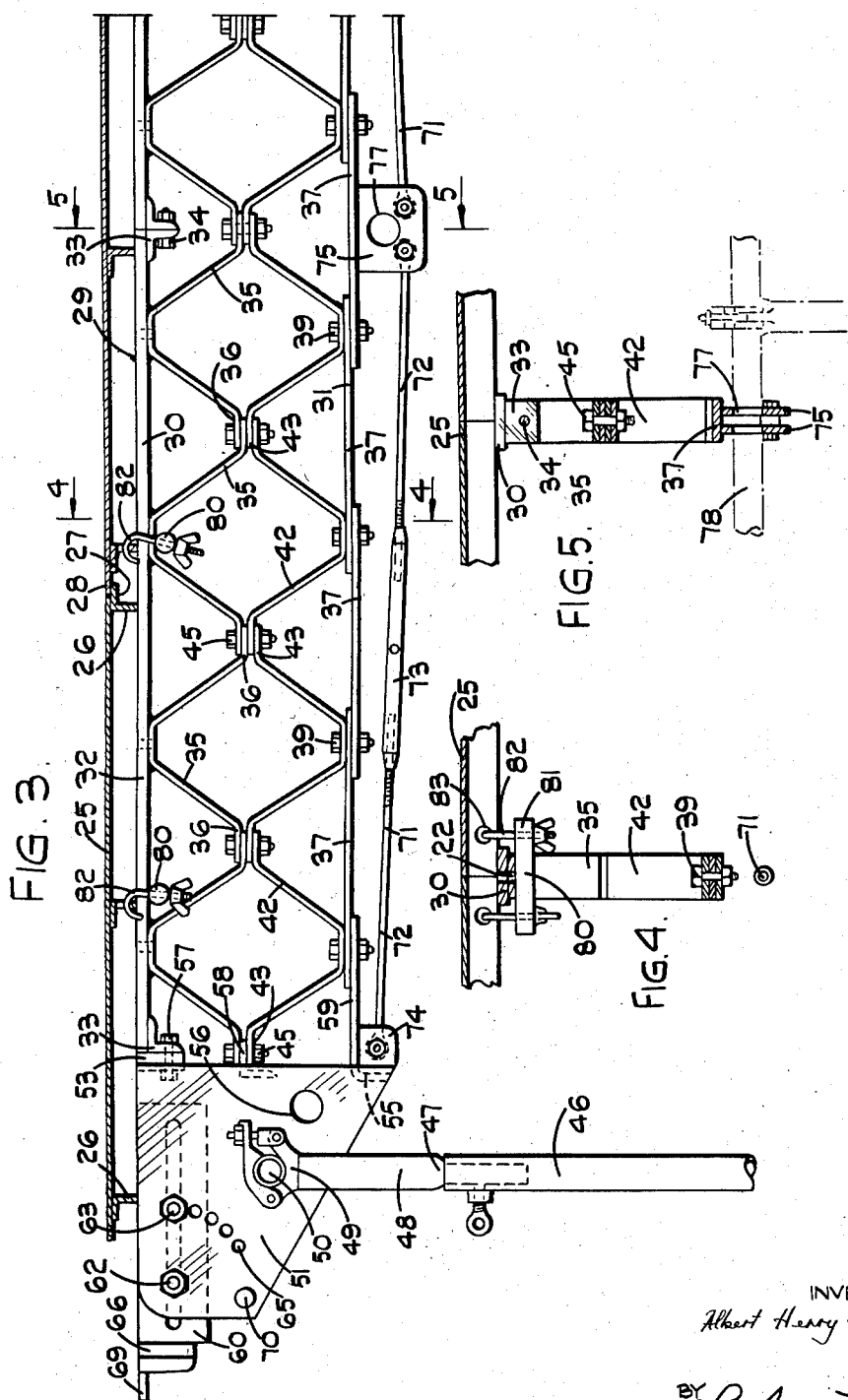

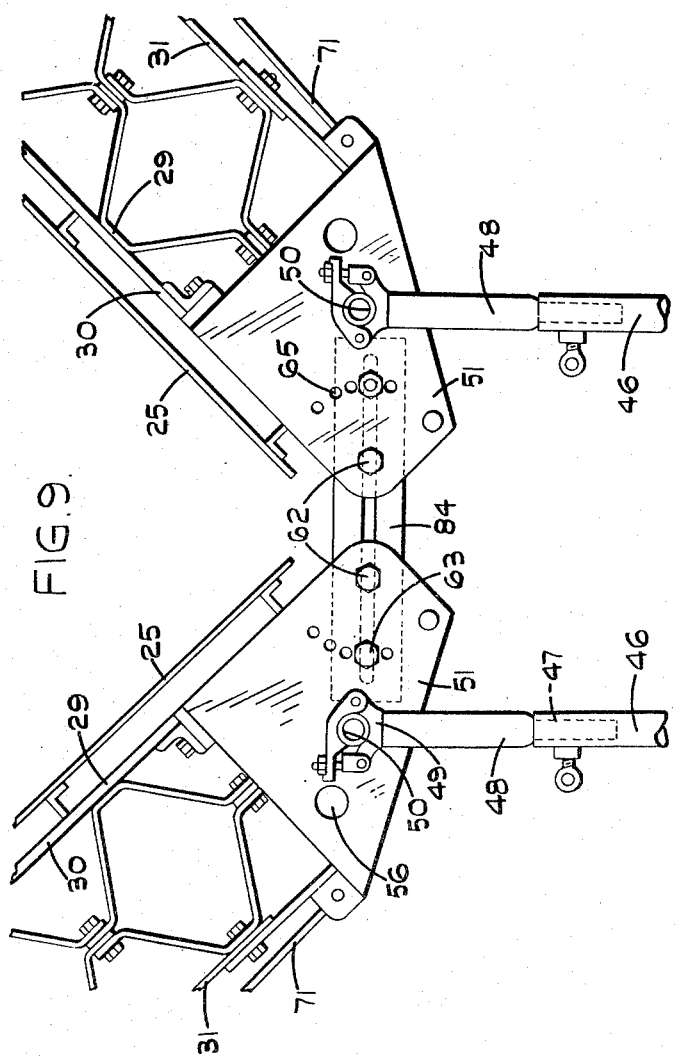

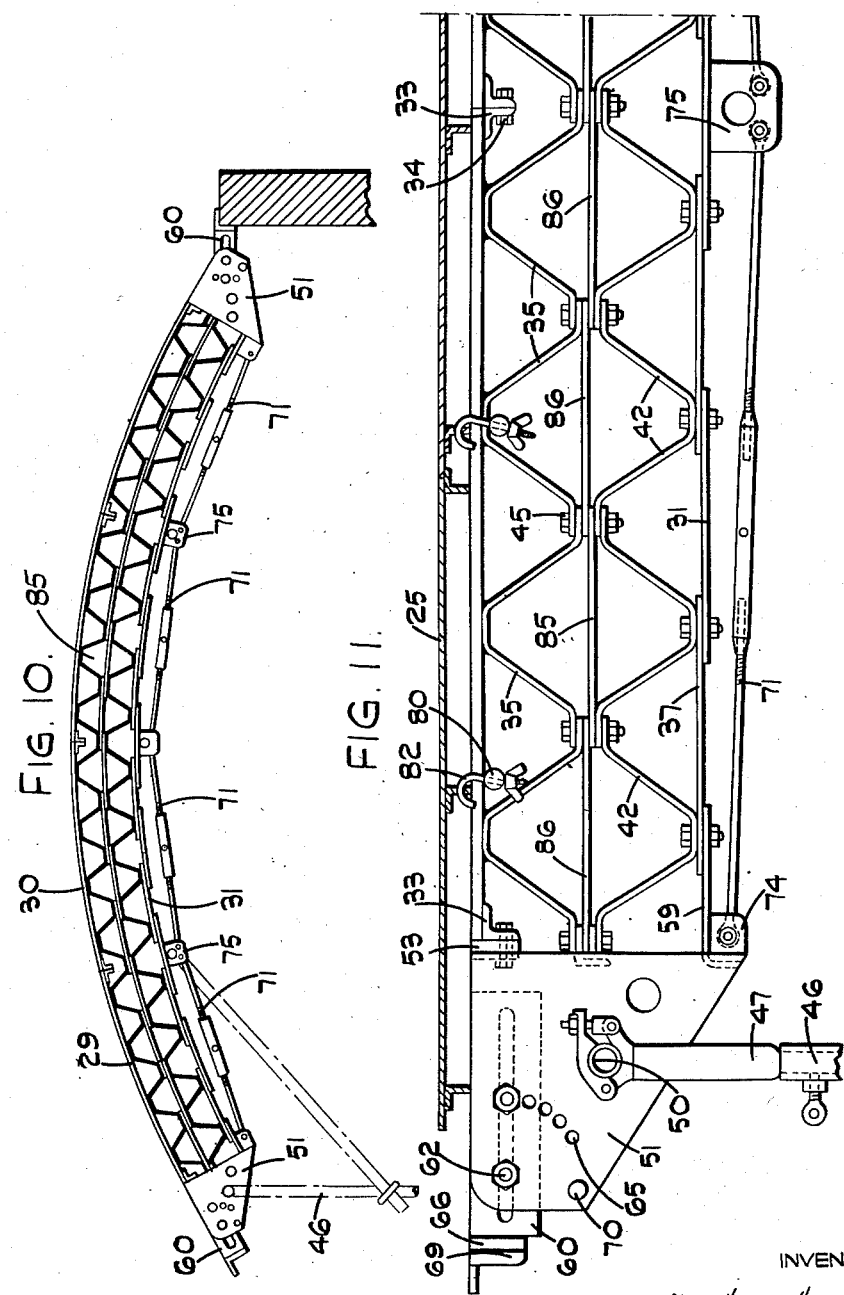

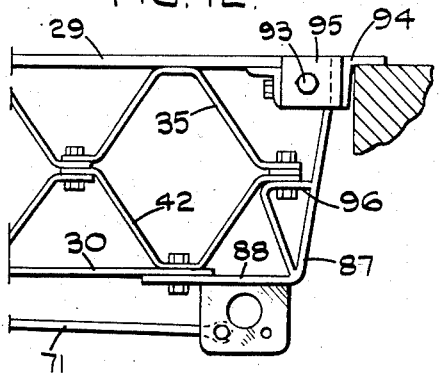
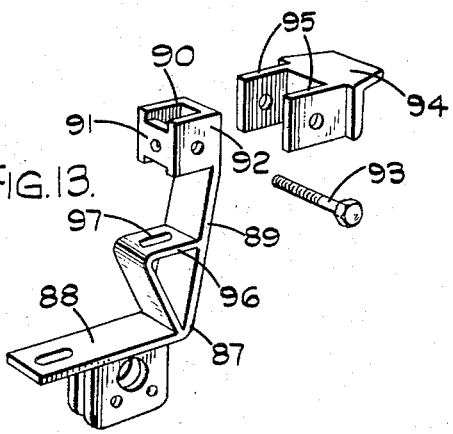
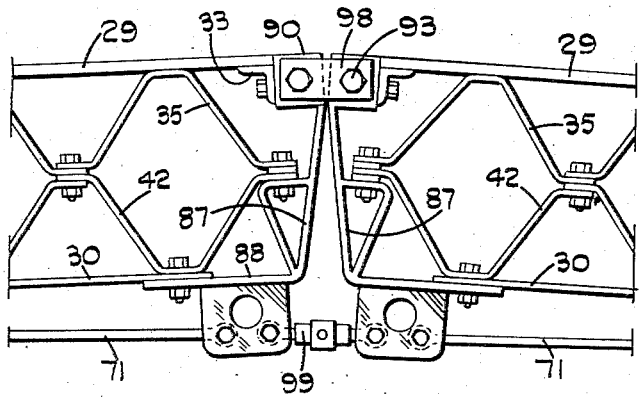

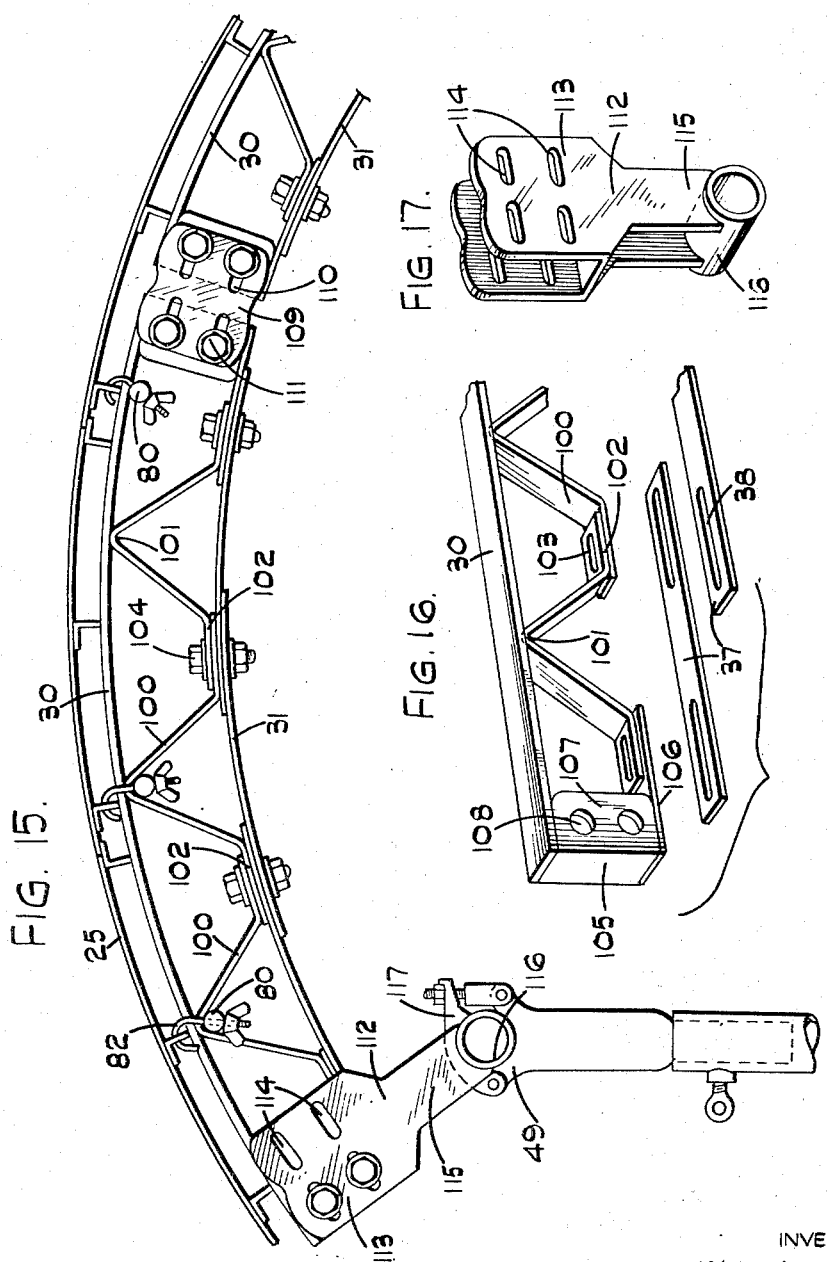

May 28, 1957  A. H. HAWES  2,793,720
SCAFFOLDING AND OTHER STRUCTURAL ELEMENTS
Filed Dec. 19, 1952  9 Sheets-Sheet 8

INVENTOR
Albert Henry Hawes

BY
Lucke & Lucke
AGENTS

May 28, 1957  A. H. HAWES  2,793,720
SCAFFOLDING AND OTHER STRUCTURAL ELEMENTS
Filed Dec. 19, 1952  9 Sheets-Sheet 9

INVENTOR
Albert Henry Hawes

BY
Lucke & Lucke
AGENTS

United States Patent Office 2,793,720
Patented May 28, 1957

2,793,720

SCAFFOLDING AND OTHER STRUCTURAL ELEMENTS

Albert Henry Hawes, Erdington, Birmingham, England, assignor to Kwikform Limited, Birmingham, England, a British company Application December 19, 1952, Serial No. 326,855

Claims priority, application Great Britain December 24, 1951

17 Claims. (Cl. 189—37)

This invention relates to scaffolding and other structural elements of the kind which are of elongated configuration so as to have overall dimensions in a direction transverse to their length such that they are essentially of beam, strut or rib-like configuration.

Such elements are commonly employed in supporting shuttering plates of metal scaffolding for use in forming concrete and like walls, floors, ceilings or roofs although they are capable of being employed in the erection of other forms of scaffolding or false work or temporary structures, and in the erection of such structures, for example, in the supporting of metal shuttering plates which are themselves of flexible configuration, it is frequently desirable to employ elements of the foregoing kind which are of different curvature predetermined by the particular shape of the wall, roof, floor or ceiling which is to be formed.

At present it is customary to employ for this purpose rigid elements of the foregoing kind pre-formed to one particular curved configuration, and such an arrangement entails the following serious disadvantages:

(a) Insofar as the elements are of rigid pre-formed particular curved configuration, they can only be employed in connection with one particular degree of curvature of the wall, roof or the like which is to be formed.

(b) It is necessary to provide a large number of sets of elements each of different curvature in order to be able readily to provide scaffolding for the erection of curved walls or roofs of curvatures commonly encountered in building construction.

(c) The elements themselves are relatively expensive in that they have to be rolled specially to the particular curvature desired.

(d) Such elements may be extremely uneconomic in practice in that during the periods when a wall, roof or the like of a particular degree of curvature is not being constructed, the elements are idle so that the capital cost involved in their provision is substantial.

The present invention has for its object the provision of an improved form of element of flexible construction which can readily be bent to varying curvatures to meet the particular requirements of the user so that the aforesaid disadvantages of existing rigid structural elements of the foregoing kind are avoided.

The present invention in its broadest aspect comprises a structural element of the foregoing kind comprising a pair of metal members each of flexible construction so as to be capable of being bent to curved configuration, each member being of elongated configuration so as to have an overall dimension in a direction parallel to its axis of curvature when bent which is substantially less than its overall dimension measured along its length, means connecting said two elongated members together in spaced opposed relationship, said connecting means being adapted to permit of relative movement occurring between the two members in a direction longitudinally of the element when the element is bent or straightened to different degrees of curvature, and means adapted to secure two elongated members and thus the element itself at the particular curvature required.

By the aforesaid statement that the overall dimension of each element in a direction parallel to its axis of curvature when bent is substantially less than its overall dimension measured along its length, is meant that the latter dimension is at least twice the value of the former dimension.

Referring to the drawings:

Figure 1 is a side elevation of one form of structural element embodying the present invention in which the element is depicted in straight or unflexed configuration so as to be adapted to support a plurality of flexible shuttering plates each in flat form.

Figure 2 is a side elevation of the construction depicted in Figure 1 showing the element curved to one particular curved configuration so as then to be adapted to support the shuttering plates aforesaid in curved form.

Figure 3 is a side elevation to an enlarged scale of part of the construction depicted in Figure 1.

Figures 4 and 5 are sectional views on the lines 4—4 and 5—5 respectively of Figure 3.

Figures 6, 7 and 8 are detached perspective views of certain parts of the same construction.

Figure 9 is a side elevation to an enlarged scale showing another application of the construction depicted in Figures 1 and 2.

Figure 10 is a view similar to Figure 2 showing a modified form of structural element in accordance with this invention.

Figure 11 is a side elevation to an enlarged scale of the element depicted in Figure 10 but showing this element of straight configuration.

Figure 12 is a side elevation showing part of an element similar to that depicted in Figure 3 but showing an alternative method of supporting one end of the element on an external support.

Figure 13 is a detached perspective view of the construction depicted in Figure 12.

Figure 14 is a side elevation showing connected together two elements of the particular form depicted in Figure 12.

Figure 15 is a side elevation of a further form of structural element in accordance with this invention.

Figures 16 and 17 are perspective views of certain of the parts of the construction shown in Figure 15.

Figure 18:
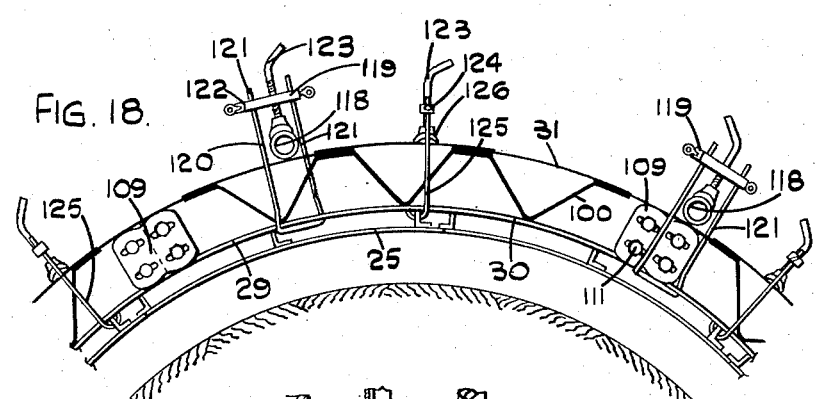

Figure 18 is a plan view of part of a scaffolding structure embodying structural elements of the form depicted in Figure 15.

Figure 19:
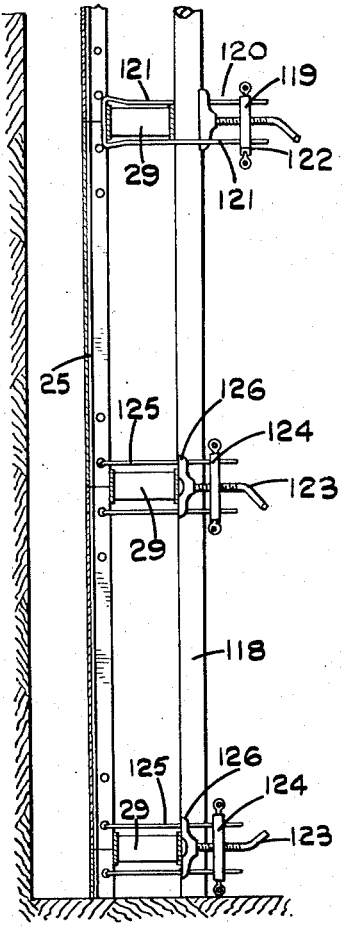

Figure 19 is a part-sectional side elevation of the structure depicted in Figure 18.

Figure 20:
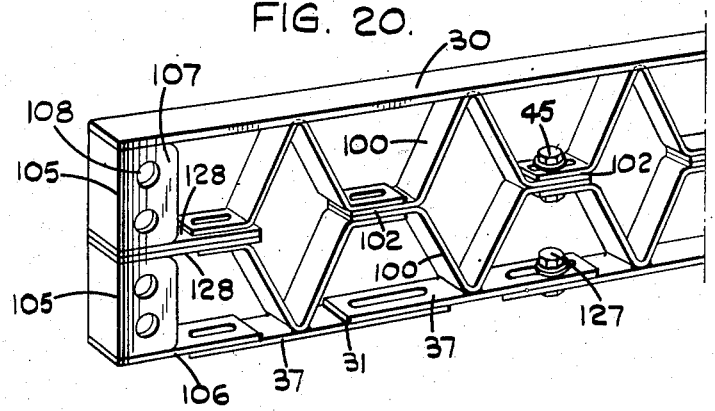
Figure 21:
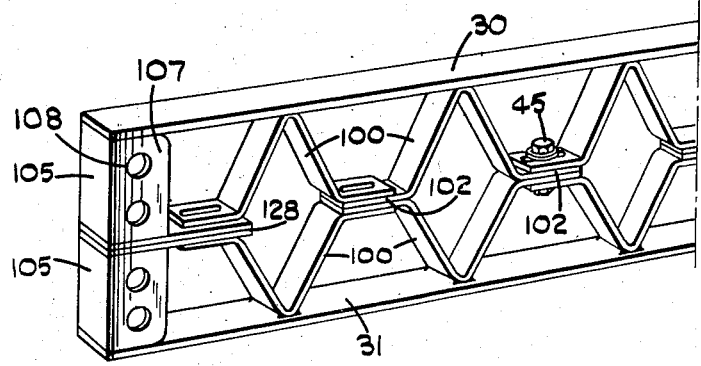

Figures 20 and 21 are perspective views showing two further modified forms of structural elements in accordance with this invention.

Each of the various constructions of structural elements depicted in the drawings is intended for use in supporting flexible metal shuttering plates for use in forming concrete and similar walls, floors, ceilings, roofs or the like, which shuttering plates as illustrated at 25 in the drawings are constructed as described in the specification of applicant's prior U. S. A. Patent No. 2,616,148, that is to say, each shuttering plate comprises a flexible metal sheet of rectangular configuration, one face of which is adapted to engage with the concrete or similar material, and the opposite face of which has secured thereto a plurality of reinforcing members 26 in the form of metal bars of angle section, one of the flanges of one of the bars extending as indicated at 27 in, for example, Figure 3, so as to provide, as described in the prior specification aforesaid, a recess adapted to receive the edge 28 of an adjacent shuttering plate sheet, whereby, as described in the prior specification, if such adjacent sheet is secured to its supporting structure, the engagement of its edge within the recess 27 aforesaid serves to secure to such structure the two adjacent sheets.

Referring now to Figures 1 to 8 of the accompanying drawings, the structural element which forms the subject of this invention is indicated generally at 29 and is essentially of beam, strut or rib-like configuration so as to be of elongated form and have a length at least twice that of its width as will be apparent from a consideration of Figures 3 to 6 of the drawings. In fact the overall longitudinal dimension of the element is very much greater than the overall width of the element.

Such element essentially comprises two metal members 30, 31 each formed of flexible metal strip so as to be capable of being bent to curved configuration, each member embodying the aforesaid relative difference between its overall length and its overall width as will again be apparent from a consideration of Figures 3 to 6 of the drawings.

One of these two members, namely, the member 30, forms a load-engaging member adapted to engage directly with the angle section bars 26 of the shuttering plates 25 so as to support the same, and the other of these two members, namely, the member 31, forms a reinforcing member.

The load-engaging member 30 as shown in Figures 1 to 8 is in fact formed from a relatively small number of similar flexible metal strips, each of which forms a load-engaging member section as depicted at 32, each section 32, as shown in Figure 3, being provided on the face thereof opposite to that which engages with the shuttering plates with brackets 33 at each end of each section, the brackets being formed with holes for receiving bolts 34, whereby a number of sections 32 can be bolted together in end-to-end aligned relationship.

Secured as by welding to the inner face of each load-engaging member section 32, i. e. to the face thereof remote in situ from the shuttering plates, are connecting means in the form of a plurality of separate connecting parts 35, each part being formed as a metal strip of diverging channel configuration having its base portion secured as aforesaid to the section 32, and having the extremities 36 of its two limbs bent outwardly in opposite parallel and substantially aligned directions.

The arrangement is such that except at the two ends of the structural element the extremity 36 of one connecting part 35 overlaps with an extremity 36 of an adjacent connecting part 35 in the manner depicted most clearly in Figure 6.

The reinforcing member 31 of the structural element is with the particular construction shown in Figures 1 to 8, built up from a very large number of separate reinforcing member strips 37 each of length, except with the two ends of the element, somewhat greater than the overall dimension of each connecting part 35 in a direction longitudinally of the element, and these strips 37 are overlapped with one another at their ends, the overlapping ends being formed with holes 38 elongated along the length of the strips 37, which elongated holes are adapted each to receive a fastening element in the form of a bolt 39, the arrangement being such that a limited relative movement is permitted in a longitudinal direction between each pair of adjacent strips forming the reinforcing member 31.

Each fastening bolt 39 passes through a slot-like hole 40 formed in the base portion 41 of one of a number of further connecting parts 42 formed of strip metal of diverging channel configuration so as to be similar to the connecting parts 35, and having their extremities similarly bent outwardly as indicated at 43 and adapted to overlap similarly with the extremities of an adjacent connecting part 42 in each case except at the two ends of the structural element.

The arrangement is such that the overlapping extremities 43 of the connecting parts 42 overlap also with a pair of overlapping extremities 36 of the connecting parts 35, and each of these four mutually overlapping extremities is formed with a slot 44 extending longitudinally of the structural element as shown in Figure 6, and through the four slots is passed in each case an intermediate connecting bolt 45, whereby the connecting parts 42 are secured to the connecting parts 35, and thus the two flexible members 30, 31 of the element are connected together in spaced opposed relationship through the medium of the connecting parts 35, 42 which accordingly constitute connecting means for securing these members together.

The provision of the slots 38 and 40 at the connection between the reinforcing member 31 and the connecting parts 42 permits of said member 31 being displaceable in a direction along its length relative to said connecting parts, and thus permits when the bolts 39 are slackened of the element 29 being bent about an axis transverse to its length from the straight configuration depicted in Figure 1 to the curved configuration depicted in Figure 2 and of relative movement occurring during such bending operation between the two members 30, 31 in a direction longitudinally of the element, while the aforesaid connection between the member 31 and the connecting parts 42 permits of relative movement similarly occurring when the member is straightened from the curved configuration depicted in Figure 2. Such relative movement between the two members 30, 31 during the bending or straightening of the element aforesaid is facilitated also by the slotted connection between the connecting parts 35, 42 where these are connected together by the intermediate connecting bolts 45, whereby the flexibility of the element when being bent to any particular curvature or straightened therefrom is enhanced.

At the same time the bolts 39 when tightened with the flexible element in the particular configuration desired serve to secure the individual strips forming the member 31 against relative movement, and further serve to secure the reinforcing member 31 against longitudinal movement relative to the load-engaging member 30, and thereby serve to secure the element itself in the particular configuration desired.

The structural element as so far described would be built up to the particular length required by connecting together the requisite number of load-engaging member sections 32 as well as the particular number of strips 37 forming the reinforcing member 31, together with the appropriate number of connecting parts 35, 42 and their associated fastening bolts 39, 45, and each end of the so-formed element is with the construction depicted in Figures 1 to 8 secured to a supporting structure in the form of a tubular metal scaffolding structure, only part of which is shown in the drawings, and which comprises inter alia two pairs of upright tubular members 46, each pair of such members being disposed at positions corresponding to the two ends of the element with the two members in each pair spaced apart transversely of the element by a distance somewhat greater than the overall width thereof.

Each scaffolding member 46 is adapted at its upper end to receive the spigoted lower end 47 of a connecting tube 48, the upper end of which carries a clamp 49, the two clamps at each end of the element being adapted to engage opposite ends of a supporting scaffold tube 50 which extends horizontally transversely through a bracket 51 provided at each end of the structural element 29.

As shown most clearly in Figure 8, each bracket 51 is of built-up construction comprising a pair of metal plates 52 connected together in spaced side-by-side relationship by means of three vertically spaced connecting lugs 53, 54, 55, each disposed adjacent the same vertical edge of the bracket, which edge is nearest to the end of the structural element.

These bracket plates 52 are formed with two pairs of aligned holes 56, through one or the other of which the scaffold tube 50 can pass, the arrangement being such that the bracket is free to turn relative to the tube about the axis thereof.

The uppermost of the three lugs, namely, the lug 53, is adapted for face-to-face engagement with the bracket 33 which is provided at the end of the adjacent load-engaging member section 32, the lug 53 being secured to this bracket by means of a bolt 57 similar to the bolts 34.

The intermediate lug 54 is formed with a flange 58 which is adapted to extend between the adjacent extremities 36, 43 of the adjacent connecting parts 35, 42 and to be secured thereto by intermediate connecting bolts 45 as above described.

The bottom lug 55 of the three lugs aforesaid is formed integrally as a dependent flange on the outer end of a metal strip 59 of a form similar to, but shorter than the strips 37 aforesaid, and this strip 59 constitutes the extremity of the reinforcing member 31, being formed at its opposite end only with the elongated hole 38 aforesaid.

It will thus be seen that each bracket 51 is secured rigidly to the adjacent end of the load-engaging member 30, connecting parts 35, 42 and reinforcing member 31.

To enable, if desired, of the structural element to be supported at one or both of its ends from the top of a wall or similar structure instead of from a scaffolding structure, each bracket 51 has mounted between its two plates 52 a lip-carrying member 60 of elongated box configuration, the two vertical sides of which member are formed with a longitudinally extending slot 61, through which slot is adapted to be inserted a pair of lip-supporting bolts 62, 63 at positions spaced longitudinally of the slots 61, the bolt 62 being provided with a single set of bolt holes 64 in the bracket plates 52 near the outer end thereof remote from the element 29.

The bracket plates 52 are further provided with a number of holes 65 for the reception of the second lip bolt 63, which holes are all disposed at the same radial distance from the corresponding hole 64, and the arrangement is such that by inserting the bolt 63 through any one of these holes 65, the lip-carrying member 60 can be maintained in a more or less horizontal position irrespective of variations in the position of the bracket 51 relative to the horizontal arising from variations in curvature of the structural element 29.

The outer end of the box-like lip-carrying member 60 has secured thereto an attachment plate 66 provided with a pair of horizontally spaced holes for the passage of fastening screws or bolts adapted to be inserted in either of two similar pairs of vertically spaced holes 67 provided in the vertical flange of a lip member 68, the horizontal flange 69 of which is adapted to rest on the top of the wall or equivalent structure so as thereby to support the adjacent end of the element 29.

In such an arrangement a limited bodily vertical movement of the element 29 relative to the wall or equivalent supporting structure is obtainable by connecting the lip-carrying member 60 to one or the other of the two pairs of vertically spaced lip holes 67; angular adjustment of the end of the structural element relative to the substantially horizontal lip 69 is permitted by the provision of the bracket bolt holes 65 aforesaid, while each lip member 68 may be displaced substantially horizontally longitudinally of the element 29 to the extent permitted by the length of the slots 61, which slots are made of a substantially greater length than the spacing between the two bolts 62, 63 when in position.

Conveniently the two plates 52 of the bracket are additionally secured together by a connecting pin 70 disposed beneath the bolt holes 64.

For effecting adjustment in the curvature of the element, particularly load adjustment thereof when the element is in situ, there is provided a bracing strut assembly, which assembly in its simplest form where the element 29 is of relatively short length would comprise merely a single strut consisting of a pair of rods having screw threads of opposite hand connected together by a turn buckle, the rods at the two ends of the strut being connected to the two ends of the structural element at the side thereof which is of concave configuration when the element is curved to the particular curvature desired, the effect of shortening such bracing strut by rotating its turn buckle in the one direction being to increase the degree of curvature, the reverse effect being obtained by lengthening the strut.

In the particular arrangement illustrated in Figures 1 to 8 of the drawings, the structural element there depicted is intended for use in supporting shuttering plates for forming the under side of an arched roof so that in operation the upper side of the element is curved to convex configuration, the under side being correspondingly concave, and this bracing strut assembly is accordingly provided at the under side of the element, and as illustrated, comprises a number of separate struts 71 each, as above described, comprising a pair of rods 72 formed at one end with an eye, the opposite end of the two rods being threaded, the threads being of different hand and being connected by a turn buckle 73.

For securing a plurality of these struts 71 to the reinforcing member 37, the strips 59 at the two extremities of such member have secured thereto a pair of dependent lug plates 74, between which one end of one of the struts 71 is secured by bolts passing through holes in these lug plates and through the adjacent rod eye. In addition certain of the strips 37 herein referred to as connector strips are, as indicated at 75, provided with a pair of strut connecting plates secured rigidly to their under sides as shown in Figure 7, each strut connecting plate being formed with a pair of holes 76 for the passage of bolts for fastening the plates to the eye ends of adjacent struts in the manner depicted in Figure 3, the plates being also formed with larger holes 77 whereby, as shown in Figure 5, a scaffold tube 78 may be passed therethrough and supported from the connector strips 37 aforesaid so as to project beyond opposite longitudinal edges thereof at right angles to the length of the element 29, and from the projecting ends of these tubes may be suspended in the known manner a staging indicated diagrammatically at 79 in Figure 1 of the drawings, which staging may be used by work people either in operating on the structural element 29 itself, or in operating on the shuttering plates thereby supported.

The bolts which connect the eyes of the struts 71 to the strips 37, 59 forming the reinforcing member are all adapted to permit of relative pivotal movement between the strut ends and the reinforcing member about an axis parallel to the axis of curvature of the element when bent, and any number of struts 71 may be connected together in the manner above described in end-to-end relationship, the struts being of standard size each adapted to give an overall adjustment in their length by their associated turn buckles of the order of six inches with the overall length of each strut being conveniently of the order of three to four feet, and to allow for smaller variations in the overall length of the element there may be provided intermediate links of length equal to half the overall length of one of these struts, such intermediate links being formed at one end with a fork for receiving one of the pivot bolts aforesaid, whereby such forked end may be connected directly to one of the struts, and at the opposite end being formed with an eye whereby it may be connected in the manner above described either to one of the intermediate brackets or to one of the end brackets as may be found most convenient.

In using elements as above described for the supporting of flexible metal shuttering plates in the formation of a concrete or like arched roof or barrel floor or ceiling, a number of elements would be provided which in situ would be disposed in side-by-side spaced parallel relationship, and these elements would first be built up to the required length having regard to the span of the structure to be formed by inserting in each element, or by removing therefrom as required, the necessary numbers of load-engaging member sections 32, connecting parts 35, 42 and reinforcing member strips 37 together with the appropriate number of bracing struts and their associated parts.

Before placing each element of the required length in situ, the element would be roughly adjusted to the desired curvature by slackening each of the fastening bolts 39, 45, thus permitting of the elements being readily bent to the desired shape by operating on each of the bracing strut turn buckles 73, the overall length of the element being such that when bent in this way, the distance between the two ends of the element corresponds to the distance between the external supports for supporting each end of the element, namely, the scaffolding structure or the wall or its equivalent.

The two ends of each structural element would then be supported from the scaffolding structure or from the wall or the equivalent as above described and as shown in the left-hand and right-hand end of Figure 2 respectively.

Final adjustment in curvature of each element now in situ would then be effected by turning each of the turn buckles of the bracing struts, and this adjustment may be effected in various ways as follows.

If all of the fastening bolts 39, 45 of the element are slackened, the element as a whole will as a result of such operation on the bracing struts be bent to varying substantially part-circular degrees of curvature, but local variations in curvature may readily be effected by tightening some of the fastening bolts 39, 45, for example, by tightening all of these bolts except those which are adjacent one particular bracing strut in a length of aligned bracing struts.

For example, in an element having an odd number of bracing struts, the element may first be adjusted to curved configuration throughout its length, each of the fastening bolts 39, 45 may then be tightened except those adjacent the centre portion of the element, and the adjacent central bracing strut may then be lengthened so as to bring this part of the element to straight or substantially straight configuration leaving the end portions thereof still curved.

Furthermore, if a particular portion of one of the two elongated flexible members constituting the element should be locally deformed or kinked, for example, as a result of mishandling on the part of the user, all of the fastening bolts may be tightened except those immediately adjacent to such deformed or kinked portion, and the associated bracing strut may be extended so as to apply a local tensile force to such kinked portion to straighten it.

During such change in curvature as may be effected in situ, when both ends of the element are being supported from a wall or the equivalent using the lip members 68, the pivot bolts 62 connecting the brackets 51 to their associated lip members 68 would be slackened and the bolts 63 withdrawn from the brackets so as to permit or both longitudinal and angular movement of the ends of the element including its associated end brackets 51 relative to the lip members 68, and finally the bolts 63 are inserted through the appropriate hole 65 so as to secure the lip members relative to the adjacent ends of the element with the lip member flanges 69 substantially horizontal. A similar procedure would be adopted in the case of the lip member concerned where the element was supported at one end only from a wall or the equivalent, i. e. as shown in Figure 2.

The upper or outer surface of the load-supporting member 30 is flush and is adapted to present a continuously convex curved surface against which can abut the angle bars 26 of the shuttering plates 25. These shuttering plates are laid on each supporting element in the general manner described in the prior specification aforesaid with their angle shaped reinforcing bars 26 extending at right angles to the length of the elements and the spacing of adjacent elements 29 would correspond to the overall dimension in such direction of the shuttering plates 25 so that each element supported the abutting ends of at least two adjacent plates as shown in Figure 4 of the drawings, the plates being secured in position in the manner described in the prior specification by means of a shuttering plate clamp 80 comprising a clamping bar 81 connected at each end to a threaded hook 82, each hook being inserted within a hole 83 formed in the adjacent angle bar flange at a position adjacent to each shuttering plate lip, the clamping bar 81 passing beneath the load-engaging member 30, the arrangement being such that each clamp, as shown in Figure 4, is adapted to secure to the element 29 four shuttering plates at a position adjacent four juxtaposed corners thereof in the manner described in the prior specification aforesaid, additional clamps 80 being provided at other positions in relation to the shuttering plates 25 as may be required.

Instead of supporting metal shuttering plates 25 as above described, each structural element may be adapted to support timber shuttering or other boards secured in position by bolts passing through the board and through holes 22 formed in the load-engaging member at 32, as shown in Figures 4 and 6.

A structural element as above described can readily be built up to varying lengths by using more or less of the parts 32, 37, 42, 71 involved, together with their associated fastening bolts, so that the user by stocking a relatively small number of different component parts can readily build up the element to the particular length required, and it is believed that each element may satisfactorily be used in span lengths varying from three to four feet and up to at least one hundred feet without any intermediate external support being provided for the element when this is used in the manner described; the closer the spacing of adjacent elements the greater the overall span of the concrete structure which can be formed without the use of intermediate bracing struts for supporting the element from an external support, such as the ground.

In Figure 9 the invention is depicted as applied to the supporting of the flexible shuttering plates in such a manner as to form a gutter between adjacent sections of the roof, and for this purpose two sets of structural elements 29 would be connected together in end-to-end relationship, adjacent ends of the two elements being connected together at the required inclination to one another for forming the gutter by connecting them through the medium of a connecting member 84 of box-like configuration and similar to the lip-supporting member 60 of the preceding construction, this connecting member being made somewhat longer than the lip-supporting member and being without the lip-carrying plate 66. This connecting member 84 is joined to each of the adjacent end brackets 51 in like manner to the lip-supporting member 60 of the preceding construction, and the end brackets with the arrangement shown in Figure 9 are supported as already described, upon the upright tubes 46 of an external supporting scaffolding structure.

In Figures 10 and 11 there is depicted a modified form of structural element generally similar to the element already described in which, however, the element is internally stiffened by means of an internal stiffening member 85 which extends longitudinally of the element for the full length thereof, such stiffening member being built up from a large number of relatively short metal strips 86 of a configuration similar to the strips 37 and similarly of a flexible nature, these strips being assembled together in end-to-end partially overlapping relationship in manner similar to the strips 37 by means of the fastening bolts 45 which serve to secure together also the connecting parts 35, 42 as already described. This internal stiffening member 85 is provided where a structural element of particularly great strength is required.

The bolt holes in the strips 86 forming such member would be slotted longitudinally thereof so as to permit of the individual strips 86 moving relatively longitudinally of the element as this is bent to varying curvatures in like manner to the strips 37.

In Figures 12 and 13 of the drawings is depicted a further modification of the construction shown in Figures 1 to 8, in which an alternative form of bracket at each end of the element is provided. This bracket is depicted at 87 in the drawings and is formed from a length of fairly rigid metal strip bent to angle shape so that one limb 88 of the bracket constitutes the extremity of the reinforcing member 30 of the element in place of the member 59 shown particularly in Figure 8 of the aforesaid already described construction.

The other limb 89 of this bracket carries at its upper end a box-like attachment part 90, one wall 91 of which disposed in spaced relation with the limb 89 corresponds to the lug 53 of the aforesaid above construction and is adapted similarly for connection to the adjacent end of the load-engaging member 30.

The two opposite longitudinally extending sides 92 of this attachment part have pivotally connected thereto by pivot bolt 93 a lip member 94 similar to the lip member 68 of the preceding construction aforesaid but provided with a pair of ears 95 which engage with the outer faces of the attachment part sides 92. Such an arrangement permits of the lip member 94 pivoting about a horizontal transverse axis relative to the structural element so as to maintain the lip member substantially horizontal for engagement with the upper surface of a wall or the equivalent but does not permit of the lip member being adjusted longitudinally in relation to the structural element.

The bracket 89 is further provided between its two limbs with a lug 96 having a slotted hole 97 for receiving one of the fastening bolts 45 whereby it can serve like the lug 54 of the preceding construction aforesaid to secure to the bracket the ends of the adjacent connecting parts 35, 42.

The arrangement shown in Figures 12 and 13 permits of a number of elements of the same length, each complete with an end bracket 89, to be pre-assembled and then connected together in end-to-end relationship so as to form a beam or the like of very long span, adjacent elements being connected together in end-to-end relationship in the manner depicted in Figure 14, in which the attachment parts 90 of adjacent brackets are connected together by fish plates 98 secured by the pivot bolts 93, additional adjustable connection between the two adjacent elements being provided by the use of a very short adjustable connecting strut 99 comprising two parts connected together by a turn buckle in manner similar to the bracing strut 71 already described.

In Figures 15 to 17 of the drawings there is depicted a further form of structural element in accordance with this invention, which element is adapted to support relatively light loads, the element comprising a load-engaging member 30 and a reinforcing member 31 as in the constructions already described, these two members being connected together in opposed spaced apart relationship by means of connecting parts 100 in the form of flexible metal strips of V configuration having their apices 101 secured permanently by welding to the inner face of the strip-like load-engaging member 30, and having their extremities 102 bent outwardly away from one another, these extremities being formed with slots 103 with the extremities of adjacent connecting parts overlapping with one another in like manner to the preceding constructions, the overlapping extremities being connected similarly by fastening elements in the form of bolts 104 to the reinforcing member 31 formed of a large number of separate strips connected together in partially overlapping adjustable relationship by the bolts 104 as in the preceding constructions.

With this latter construction instead of forming each load-engaging member 30 in such a manner that a number of such members can be secured directly together by bolts in aligned end-to-end relationship so as to build up an element of long length, each single length of metal strip forming the member 30 is provided at each end thereof with an end bracket 105 of channel configuration, the member 30 being secured to one end, namely, the upper end of the bracket, the lower end of the bracket being secured to a relatively short strip 106 forming the extremity of the reinforcing member 31. The two sides 107 of the channel-shaped bracket are each formed with a pair of vertically spaced connecting holes 108 whereby adjacent brackets of end-to-end aligned elements can be secured together to build up an element of varying length by means of fish plates 109 each formed with four bolt holes 110 of elongated configuration, the fish plates being disposed on each side of the two adjacent brackets and being secured thereto by bolts 111, the elongated configuration of the fish plate holes 110 permitting of a certain relative longitudinal and angular movement between the connecting brackets.

This latter construction is not adapted for supporting upon the top of a wall or the equivalent and is intended to be supported from a scaffolding structure for which purpose there is provided supporting yokes 112 shown in Figure 17, which yokes comprise a pair of plates 113 connected together in opposed side by side relationship, each plate being formed with four bolt holes 114 in manner similar to the fish plates 109, whereby a yoke may be connected, as shown in Figure 15, to one element only, or, if desired, the two elements so as also to connect them together in place of the fish plates 109.

Each plate 113 is provided with a dependent portion 115, the two portions being spaced apart from one another and connected at their lower ends by a short length of tube 116, which latter is adapted to be secured to a single scaffolding clamp 49 as in the case of the construction shown in Figure 3, the hinged part 117 of the clamp passing between the two dependent portions 115 of the yoke, the clamp being carried on a supporting scaffolding structure as in the case of the construction shown in Figure 3.

The construction shown in Figures 15 to 17 does not embody bracing struts as in the case of the constructions already described and is adapted to be bent to the desired curved configuration merely by being grasped by the user's hands, the fastening bolts 104 being tightened when the element has been bent to the particular configuration desired.

Although as shown in Figure 15 the load-engaging member has its outer face bent to convex configuration as in the case of the constructions previously described, the element may be curved in the opposite direction so that this face of the load-engaging member is bent to concave configuration so as to permit of the elements being employed, for example, in the formation of a convexly curved surface of concrete or like material, for example, the exterior of a circular or like tower in the manner shown in Figures 18 and 19.

Such configuration of the structural elements is effected merely by extending relatively the individual strips forming the reinforcing member 31, and with the particular arrangement illustrated in Figures 18 and 19 a number of elements would be assembled together so as each to form an element of ring-like configuration so as to extend continuously around the exterior of the structure to be formed, the rings of elements being supported at vertically spaced intervals by means of a supporting structure comprising a plurality of vertically extending scaffold tubes 118, to which tubes the elements are secured by clamps 119, each clamp comprising an attachment portion 120 comprising a length of bar or wire bent to more or less U configuration and adapted to embrace the load-engaging member 30 of the element with the two limbs 121 of the attachment portion extending one above and one beneath the element 29, the outer ends of these limbs being connected releasably by a bridge 122 carrying a clamping screw 123 for engaging with one side of each scaffold tube 118, the opposite side of which engages directly with the outer face of the adjacent reinforcing member 30.

In such an arrangement the shuttering plates 25 would be secured in position by further clamps 124 of configuration generally similar to the clamps 119 but provided with a pair of hooks 125 as in the case of the clamp 80 shown in Figure 4, and the clamping screw 123 of these clamps 124 is in this case adapted through its pressure plate 126 to engage with the outer face of the reinforcing member 31 in a manner which will be apparent from a consideration of Figure 19.

In Figure 20 is depicted a modification of the construction shown in Figures 15 to 17, in which instead of fastening the connecting parts 100 carried by the member 30 directly to the member 31, the latter has similarly secured thereto further identical connecting parts 100, the apices of which are each joined to one of the separate metal strips 37 which form the reinforcing member so that the reinforcing member 31 is connected to the load-engaging member 30 in manner similar to the construction shown in Figures 1 to 8 with the extremities 102 of the connecting parts 100 similarly connected adjustably by fastening bolts 45. In this latter construction the individual strips 37 forming the reinforcing member 31 are joined together adjustably by adjusting bolts 127 which serve merely to connect adjacent strips together and do not, as in the case of the preceding constructions, serve also to secure thereto the connecting parts, whereby the two members 30, 31 are connected together.

In the construction shown in Figure 20, the end brackets at each end of the element are formed by two brackets disposed in superposed relationship as shown at 105 in Figure 16, the adjacent ends of the two brackets having each secured thereto a connecting strip 128 similar to the strip 106 which forms the extremity of the reinforcing member 31 as in the construction shown in Figure 16, these two connecting strips 128 being disposed in face-to-face abutment and being adapted to receive fastening bolts similar to the bolt 45 illustrated in the drawings for securing thereto the adjacent extremities of the connecting parts 100.

A modification of the construction shown in Figure 20 is depicted in Figure 21 in which the reinforcing member 31 is formed as a continuous strip identical with the strip forming the load-engaging member 30 so that either of these two members may in fact serve as load-engaging and reinforcing members according to the disposition of the element. In this latter construction relative longitudinal movement between the two members during the bending of the element to varying curved configurations is permitted by the slot or elongated hole connection between the overlapping extremities of the connecting parts 100 where these are fastened together by the fastening bolts 45, and the arrangement does not permit of the element being bent to such widely varying degrees of curvature as are permitted with the element of the preceding constructions. On the other hand the fact that each of the two members 30, 31 are continuous through the entire length of each section thereof instead of the member 31 being formed from a large number of strips of very short length does provide a somewhat stiffer and more rigid form of element than is the case with a construction such as that shown in Figure 20.

From the foregoing it will be seen that the present invention provides a structural element which is particularly applicable for use as a beam, which element can readily be bent by the user to varying degrees of curvature, thereby providing a construction in which the disadvantages above enumerated of the aforesaid preformed elements, such as beams or ribs, are necessarily avoided.

Although the invention has been described primarily as applied for use in the supporting of metal shuttering plates of flexible form for use in the formation of concrete arched roofs, floors, ceilings and other curved concrete structures, structural elements in accordance with this invention are applicable to other purposes in which various other forms of scaffolding or false work, or temporary structures, for example, temporary roofs for buildings, are required to be supported and maintained at predetermined different degrees of curvature.

One such further application of the invention would be to the supporting of canvas or hessian sheets in which these sheets would be supported on the outer or convex sides of the elements disposed in spaced substantially parallel relationship, cement or plaster-like material being sprayed on to the outer or convex sides of the sheets so as to form curved structures of the required configuration.

Other applications of the invention are in the construction of false work for use in the building of aircraft wings and fuselage, or in the construction of ships wherein it is advantageous to provide structural elements in the false work which can be bent to predetermined degrees of curvature.

What I claim then is:

1. A structural element comprising a pair of metal members of elongated configuration, means connecting said two elongated members together in spaced opposed relationship, said two connected members being bendable in a common plane to different degrees of curvature about an axis of curvature transverse to the length of said element, said connecting means comprising two sets of connecting elements joined one to each of said two bendable members, said two sets of connecting elements being displaceable relatively in a direction longitudinally of said structural element thereby permitting of relative movement occurring between the two bendable metal members in a direction longitudinally of the structural element and of the latter being bent or straightened to different degrees of curvature, and means adapted to secure said two sets of connecting elements in their relative longitudinally adjusted position to retain the structural element in the form of the particular curvature required.

2. A structural element comprising a pair of elongated metal members of flexible construction so as to be capable of being bent in one general direction only to curved configuration about an axis transverse to their length, so that said two members are normally one of convex and the other of concave configuration on their respective outer faces, means connecting said two elongated members together in spaced opposed relationship, said connecting means comprising two sets of connecting elements joined one to each of said two bendable members, said two sets of connecting elements being displaceable relatively in a direction longitudinally of said structural element thereby permitting of relative movement occurring between the two flexible metal members in a direction longitudinally of said structural element, at least one extensible and contractible rigid bracing strut extending substantially longitudinally of said structural element, and means securing the two extremities of each bracing strut to said latter elongated member of the structural element.

3. A structural element according to claim 2, wherein said elongated member which in situ is normally of concave configuration on its outer face is formed from a large number of separate elements, releasable fastening means connecting said elements together in end-to-end relationship extending longitudinally of the structural element, said elements being adapted when their connecting fastening means is released to have limited relative movement in a direction longitudinally of the structural element, each of said releasable fastening means being operable independently of the other, for the purpose specified.

4. A structural element according to claim 2, wherein said elongated member thereof which is adapted normally to be curved to concave configuration on its outer face is provided at intervals along its length with pairs of outwardly projecting lugs, a plurality of bracing struts being provided each comprising a pair of screw threaded rods having screw threads of opposite hand connected together by a turn buckle nut, the oppositely directed ends of the two rods of each strut being provided with eyes which are disposed between the two lugs of each pair of lugs and connected pivotally thereto in end-to-end relationship with the opposed ends of adjacent bracing struts each connected to a common pair of lugs.

5. A structural element comprising a pair of metal members each of flexible construction so as to be capable of being bent to curved configuration, each member being of elongated configuration so as to have an overall dimension in a direction parallel to its axis of curvature when bent which is substantially less than its overall dimension measured along its length, means connecting said two elongated members together in spaced opposed relationship, said connecting means being adapted to permit of relative movement occurring between the two members in a direction longitudinally of the element when the element is bent or straightened to different degrees of curvature, one of said two elongated flexible members constituting a load-engaging member adapted for direct engagement on its outer face remote from the element with the load to be supported, said member comprising a plurality of metal strips secured in end-to-end abutting relationship so as to present a continuously flush surface to the load to be supported, the other of said two elongated flexible members constituting a reinforcing member, said reinforcing member being built up from a plurality of flexible metal strips each formed at their two ends with a slot extending longitudinally of the strip, adjacent strips overlapping with one another at their said two ends, and a releasable fastening bolt passing through the two slots in each of the overlapping ends of the said strips and serving to connect the said strips adjustably together in such a manner that relative movement can occur between the two strips in a direction longitudinally of the element when the curvature thereof is adjusted, said fastening bolts when tightened being adapted to secure the element in the particular curved configuration to which it may have been adjusted.

6. A structural element according to claim 5, wherein the means for connecting said two elongated members together in spaced opposed relationship comprise flexible connecting strips connected to each of said two members, said fastening bolts serving to secure said connecting strips adjustably to said reinforcing member strips.

7. A structural element comprising a flexible load-engaging strip adapted on one face to engage with a load to be supported, a plurality of flexible connecting member strips spaced longitudinally of said element, means securing said connecting member strips to the opposite face of said load-engaging member strip, a plurality of flexible reinforcing member strips arranged in substantially end-to-end relationship but with the ends of adjacent strips overlapping, each of said overlapping ends being formed with a slot extending longitudinally of said reinforcing member, each of said connecting strips being formed with a slot extending longitudinally of said connecting member, fastening bolts passing through the slots in the overlapping ends of said reinforcing member strips and through said slots in said connecting member strips and securing said reinforcing member strips together and to said connecting member strips.

8. A structural element comprising a flexible load-engaging strip adapted on one face to engage with a load to be supported, a plurality of flexible connecting member strips spaced longitudinally of said element, means securing said connecting member strips to the opposite face of said load-engaging member strip, a plurality of flexible reinforcing member strips arranged in substantially end-to-end relationship but with the ends of adjacent strips overlapping, each of said overlapping ends being formed with a slot extending longitudinally of said reinforcing member, each of said connecting strips being formed with a slot extending longitudinally of said connecting member, fastening bolts passing through the slots in the overlapping ends of said reinforcing member strips and through said slots in said connecting member strips and securing said reinforcing member strips together and to said connecting member strips, lugs on some of said reinforcing member strips, extensible bracing struts disposed adjacent the outer faces of said reinforcing member strips extending longitudinally of said element, and means connecting opposite ends of said bracing struts to said lugs.

9. A structural element of the foregoing kind, comprising a pair of elongated strip metal members, each of said members being of substantially flat elongated configuration in cross section so as to be freely bendable throughout their entire length, means connecting said two elongated members together in spaced opposed relationship said connecting means controlling the degree of bend of each of said members throughout substantially the entire length of the element, means adapted to apply a force to the element locally of its length between a plurality of different positions spaced along the length of the element so as to increase or decrease the curvature of the element locally, and means for securing the element to the particular curved configuration into which it has been so conformed.

10. A structural element comprising a pair of strip metal members of elongated form and each of substantially flat elongated configuration in cross section, each of said strip metal members being bendable about an axis parallel to their major axis of cross section, said two strip metal members being connected together in spaced opposed relationship with their respective major axes of cross section parallel to one another, by connecting means comprising two longitudinally extending rows of flexible metal connecting strips of trough configuration, each of the two elongated strip metal members being connected to the part joining the two limbs of each of the two connecting strips in each of said two rows, said connecting strips having the extremities of their limbs formed with slots, releasable fastening bolts extending through said slots and securing together adjacent strips in the two rows in such a manner as to permit of relative movement between the two rows of strips when the curvature of the structural element is varied.

11. A structural element according to claim 10 wherein an intermediate reinforcing member extending longitudinally of the element is provided, said reinforcing member being disposed between the two rows of connecting strips, and comprising a plurality of flexilble metal strips formed at their ends with longitudinaly extending slots, adjacent strips of said reinforcing member being disposed with their adjacent ends in overlapping relationship, and said fastening bolts which secure together the two rows of said connecting strips passing also through the slots in the overlapping ends of said reinforcing member strips so as to connect the two rows of connecting strips to one another and to the internal reinforcing member in such a manner as to permit of relative longitudinal movement between each of the strips so connected when the curavture of the element is adjusted.

12. A structural element, comprising a pair of metal members of elongated configuration, means connecting said two elongated members together in spaced opposed relationship, said two connected members being bendable in a common plane to different degrees of curvature about an axis of curvature transverse to the length of said element, said connecting means comprising two sets of connecting elements joined one to each of said two bendable members, said two sets of connecting elements being displaceable relatively in a direction longitudinally of said structural element thereby permitting of relative movement occurring between the two bendable metal members in a direction longitudinally of the structural element and of the latter being bent or straightened to different degrees of curvature, means adapted to secure said two sets of connecting elements in their relative longitudinally adjusted position to retain the structural element in the form of the particular curvature required, a supporting bracket connected rigidly to the adjacent end of the two elongated flexible members, and means for supporting said bracket from an external supporting scaffolding structure in such a manner as to permit of said bracket turning relatively to said structure about an axis extending transversely of the structural element when the curvature of the latter is adjusted.

13. A structural element comprising a pair of strip metal members of elongated form and each of substantially flat elongated configuration in cross section, said two strip metal members being connected together in spaced opposed relationship with their respective major axes of cross section parallel to one another, by connecting means comprising a plurality of flexible metal connecting strips of trough configuration, means securing the part joining the two limbs of each of the trough configuration strips to one of said two strip metal members, means securing the extremities of the limbs of the said connecting strips to the other of the said two strip metal members, said securing means being adapted to permit of relative movement occurring between the two members in a direction longitudinally of the element when the element is bent or straightened to different degrees of curvature about axes of curvature parallel to the major axes of cross section of said strip metal members, and said securing means being adapted also to retain said two elongated members releasably with the element at the particular curvature desired.

14. A structural element comprising a pair of metal members of elongated configuration, means connecting said two elongated members together in spaced opposed relationship, said two connected members being bendable in a common plane to different degrees of curvature about an axis of curvature transverse to the length of said element, said connecting means comprising two sets of connecting elements joined one to each of said two bendable members, said two sets of connecting elements being displaceable relatively in a direction longitudinally of said structural element thereby permitting of relative movement occurring between the two bendable metal members in a direction longitudinally of the structural element and of the latter being bent or straightened to different degrees of curvature, means adapted to secure said two sets of connecting elements in their relative longitudinally adjusted position to retain the structural element in the form of the particular curvature required, a supporting bracket connected rigidly at one end of said structural element to each of the two elongated flexible members, and means for supporting said bracket from an external supporting scaffolding structure in such a manner as to permit of said bracket turning relative to said structure about an axis extending transversely of the structural element when the curvature of the latter is adjusted.

15. A structural element comprising a flexible strip metal load-engaging member adapted to engage with a load on one face thereof, a first row of flexible connecting strips of trough configuration having the part joining its two side limbs connected permanently to the opposite face of said load-engaging member strip and having the extremities of their limbs bent in opposite directions parallel to the length of said load-engaging member strip, a second row of connecting member strips of channel configuration having the extremities of their limbs bent outwardly in opposite directions parallel to the length of said load-engaging member strip, said outwardly bent extremities of adjacent strips in each row being disposed in overlapping relationship with one another and being there formed each with a slot extending longitudinally of the element, a fastening bolt passing through each of the overlapping slotted extremities of said connecting strips so as to secure the two rows of strips to one another as well as to secure together adjacent strips in each of the said two rows in such a manner as to permit of relative movement longitudinally of the element between each of the strips so connected, a reinforcing member comprising a plurality of flexible metal strips disposed in substantially end-to-end relationship but with the two contiguous ends of mutually adjacent reinforcing member strips in overlapping relationship with one another, said overlapping ends each being formed with a slot extending longitudinally of the element, a slot formed in the bases of the second row of channel shaped strips, and further fastening bolts passing through said last-mentioned slots and the said slots in each of said pairs of overlapping ends so as to secure said reinforcing member strips to said second row of connecting strips, while permitting of said reinforcing member strips being adjusted relative to one another and to said load-engaging member in a direction longitudinally of the element.

16. A structural element comprising a pair of strip metal members of elongated form and each of substantially flat elongated configuration in cross section, connecting means embodying openings elongated longitudinally of the element with projections slidable longitudinally of the openings connecting said two elongated members together in spaced opposed relationship, with their major axes of cross section parallel to one another, each of said two strip metal members being inherently flexible and being each bendable throughout at least substantially the entire length of the element about an axis of curvature parallel to their respective major axes of cross section, at least one of said two members being displaceable in a direction along its length relative to at least part of said connecting means so as thereby to permit of the two members being bent to different degrees of curvature about axes parallel to said major axes of cross section, and means adapted releasably to secure said projections against movement longitudinally of said openings to retain said two elongated members and thus the element itself at the particular curvature required.

17. A structural element comprising a pair of strip metal members of elongated form and each of substantially flat elongated configuration in cross section so as to be freely bendable throughout substantially their entire length, means connecting said two elongated members together in spaced opposed relationship, with their major axes of cross section parallel to one another, said connecting means controlling the degree of bend of each of said members throughout substantially the entire length of the element, at least one of said two members being displaceable in a direction along its length relative to at least part of said connecting means so as thereby to permit of the two members being bent to different degrees of curvature about axes parallel to said major axes of cross section, and means for securing the structural element in the particular curved configuration into which it has been so conformed.

References Cited in the file of this patent

UNITED STATES PATENTS

| 938,718 | Smith | Nov. 2, 1909 |
| 1,233,743 | Arndt | July 17, 1917 |
| 1,277,186 | Brynoldt | Aug. 27, 1918 |
| 1,853,645 | Stambaugh et al. | Apr. 12, 1952 |
| 2,687,193 | Hinze | Aug. 24, 1954 |